(12) United States Patent
Choyce

(10) Patent No.: US 6,302,236 B1
(45) Date of Patent: Oct. 16, 2001

(54) PULSATION DAMPER

(75) Inventor: Alan Brian Choyce, Bodegraven (NL)

(73) Assignee: Q.E. International B.V., Bodegraven (NL)

( * ) Notice: Subject to any disclaimer, the term of this patent is extended or adjusted under 35 U.S.C. 154(b) by 0 days.

(21) Appl. No.: 09/486,478

(22) PCT Filed: Aug. 28, 1998

(86) PCT No.: PCT/NL98/00486

§ 371 Date: Feb. 28, 2000

§ 102(e) Date: Feb. 28, 2000

(87) PCT Pub. No.: WO99/11938

PCT Pub. Date: Mar. 11, 1999

(30) Foreign Application Priority Data

Aug. 29, 1997 (NL) .................................................. 1006892

(51) Int. Cl.⁷ .................................................... F01N 1/08
(52) U.S. Cl. ......................................... 181/272; 181/252
(58) Field of Search ................................... 181/255, 256, 181/258, 257, 269, 272, 282

(56) References Cited

U.S. PATENT DOCUMENTS

| 3,957,133 | 5/1976 | Johnson . |
| 4,011,922 | 3/1977 | Goplen . |
| 5,365,025 | * 11/1994 | Kraai et al. ............................ 181/249 |
| 5,563,382 | 10/1996 | Choyce . |
| 6,082,487 | * 7/2000 | Angelo et al. ......................... 181/256 |
| 6,109,387 | * 8/2000 | Boretti ................................. 181/230 |
| 6,155,379 | * 12/2000 | Nakagawa ............................ 181/256 |

FOREIGN PATENT DOCUMENTS

| 475398 A1 | 3/1992 | (EP) . |
| 08/114110 | 5/1996 | (JP) . |

OTHER PUBLICATIONS

Database WPI, Week 901415 Sep. 1989, Derwent Publications Ltd., London, GB, AN 90–105822, XP002064184, and SU 1 507 997 A (Armn Hygiene Inst.) Sep. 15, 1989.

* cited by examiner

Primary Examiner—Robert E. Nappi
Assistant Examiner—Kim Lockett
(74) Attorney, Agent, or Firm—Fitch, Even, Tabin & Flannery

(57) ABSTRACT

A pulsation damper including an inlet, an outlet and a silencing member is disclosed. At least one of the inlet and the outlet is provided with a diffuser including a tubular member provided with a plurality of first openings, a plurality of second openings and reinforcement bodies extending around the tubular member. At least one of the second openings is covered by a plate having the first openings, smaller than the second openings therein.

19 Claims, 3 Drawing Sheets

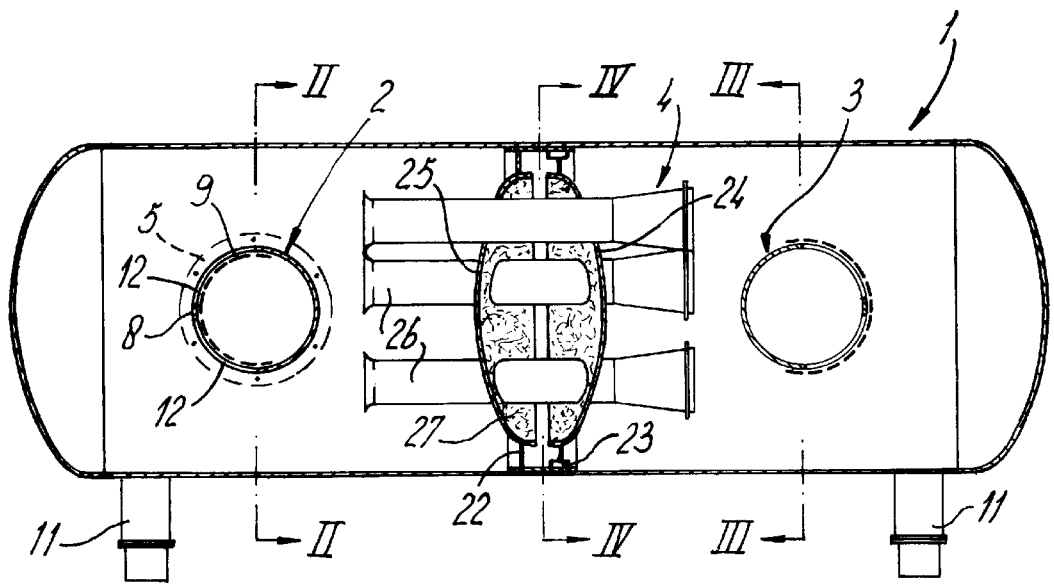
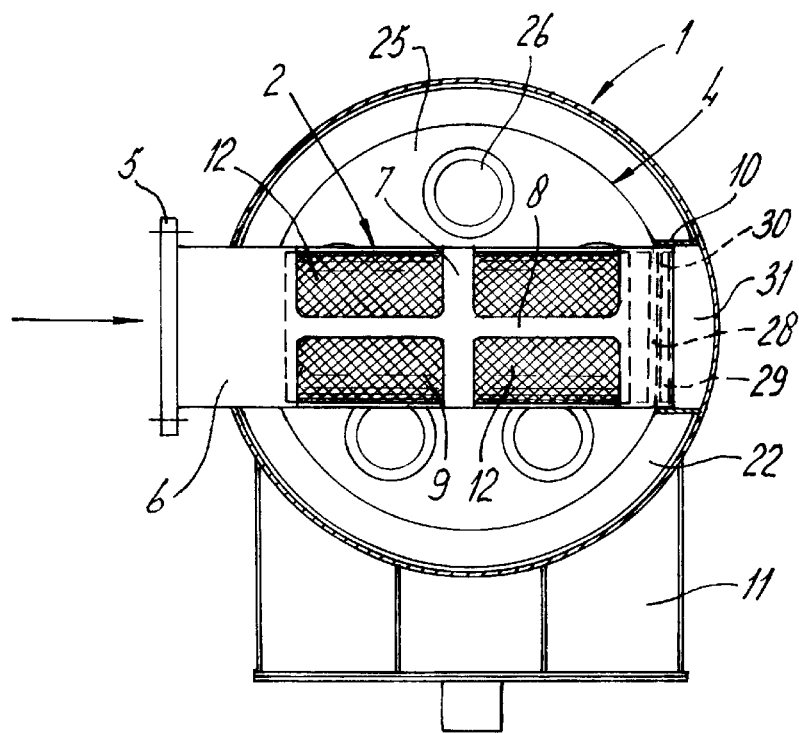

PULSATION DAMPER

This application is the national phase of international application PCT/NL98/00486 filed Aug. 28, 1998 which designated the U.S.

The present invention relates generally to a pulsation damper and more specifically to a pulsation damper having a diffuser.

A damper of this kind is known from U.S. Pat. No. 5,563,382 and serves to damp gas pulses with a frequency of less than 100 Hz and preferably between 10 and 20 Hz. In doing so, it is necessary to satisfy the requirements of various standards, of which the API standard is the most important. This standard prescribes that the peak-to-peak pulsation with respect to the average absolute pressure is never more than 2% of the average sound level.

On the other hand, of course, it is prescribed that the pressure loss through a damper of this nature is as low as possible. For a low-pressure system which operates, for example, between 2 and 3 bar, this means that a maximum pressure loss of 15–20 millibar is permissible.

Currently, the market is demanding an ever increasing improvement in the silencing action, i.e. that the average sound level be limited to an ever greater extent. This results, on the one hand, from the wish to cause less environmental pollution and, on the other hand, from the mechanical load which is caused by pressure pulses in devices which are connected downstream of the sound absorber.

Moreover, it is required that large sound absorbers should have a particularly long service life, i.e. should function for at least five years without maintenance. Since dampers of this kind are produced from standard steel grades, corrosion and the like play an important role. It is also important that in the event of possible damage caused by long-term load the damaged components should be easy to replace.

The object of the present invention is to provide a pulsation damper which has improved damping characteristics without its design being complicated to any significant extent. Another object of the invention is to increase the service life of diffuser pipes of this nature. One way of damping sound waves is to arrange a diffuser either in the inlet or in the outlet. In the prior art, a diffuser of this nature comprises a pipe-like part which is provided with a perforation. In this case, the total surface area of the free passage of the perforations is at least equal to the total inlet or outlet surface.

Owing to the relatively small openings, perforations of this kind are particularly exposed to corrosive conditions. In practice, it has been found that, in particular, perforated parts of pipes rupture under the pressure wave load after a relatively short time.

This object is achieved with a pulsation damper as described having the characterising features of claim 1. The perforated part of the diffuser is reinforced by means of reinforcement bodies extending along the circumference. These are preferably realized by starting from a pipe and forming windows in this pipe with large openings by, for example, cutting, while reinforcement bodies of this nature extending along the circumference remain in place between the openings. Naturally, in a design of this nature longitudinal bodies are present in order to provide sufficient strength in the axial direction. In a design of this nature, the perforation can be realized in a particularly simple manner by arranging perforated plates on the openings or windows obtained in this way. Depending on the design of the diffuser, perforated plates of this nature will be arranged on the inside or outside of the pipes. If the diffuser is an inlet diffuser, the gas pressure from the inside of the pipe will act outwards, so that it is preferable to arrange a perforated plate of this nature on the inside. For an outlet diffuser, this situation is precisely reversed.

According to an advantageous embodiment, both an inlet diffuser and an outlet diffuser are provided.

In order to promote the damping action further, it is proposed to provide perforations only on that part of the diffuser pipe which faces away from the associated outlet or inlet respectively. In other words, if an inlet diffuser is used, the perforations are directed away from the outlet, and if an outlet diffuser is used, the perforations are directed away from the inlet.

The damping members described above may comprise any structure known in the prior art. Preferably, however, a so-called multipipe damper is used. This comprises a pipe-supporting structure which is completely closed, through which pipe-supporting structure there extend a number of pipes which connect the two closed-off chambers in the vessel to one another. According to the invention, this pipe-supporting structure comprises two curved plate parts which lie at a distance from one another. In this case, the curvature is always directed away from the adjoining plate part in question, so that a "hamburger-like" structure is produced. Possibly, a further sound-absorbing material, such as bituminous material, may be arranged between these two plates.

The invention will be explained in more detail below with reference to an exemplary embodiment which is depicted in the drawing, in which:

FIG. 1 shows a side view, partially in section, of the pulsation damper according to the invention;

FIG. 2 shows a cross-section on line II—II in FIG. 1;

Figure 3:
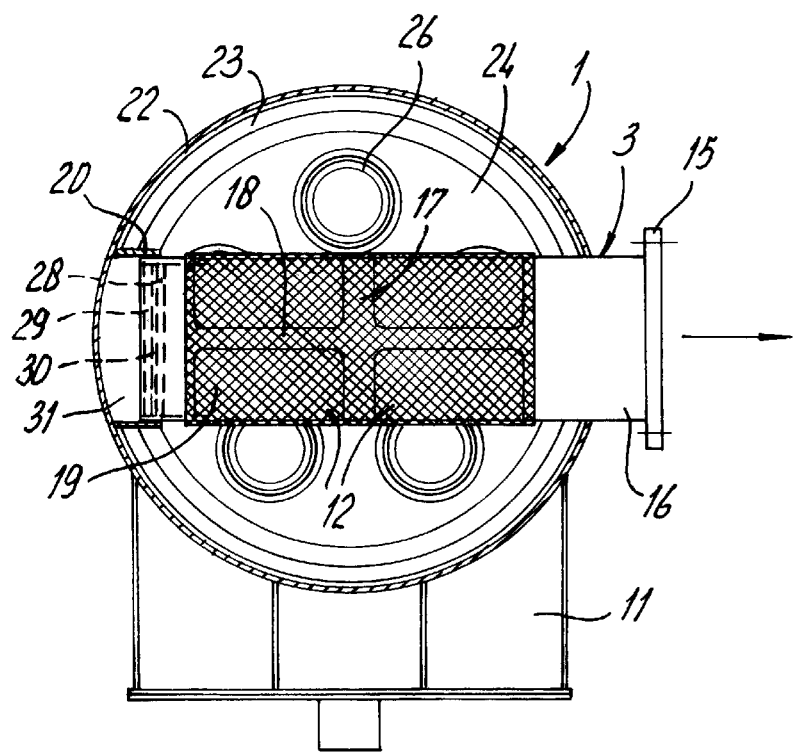
FIG. 3 shows a cross-section on line III—III in FIG. 1.
Figure 4:
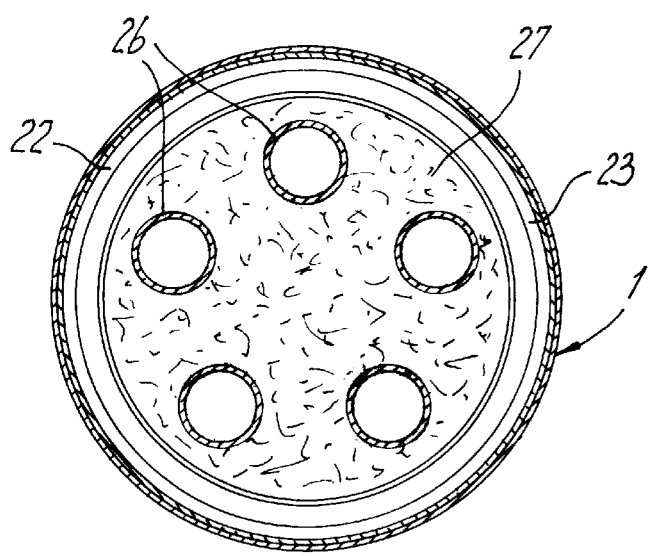
FIG. 4 shows a cross-section on line IV—IV in FIG. 1.

FIG. 1 shows a pulsation damper. It consists of a vessel 1 which may have any size known in the prior art for the purpose of damping low-frequency vibrations. The inlet 2 of this vessel is connected, optionally directly and in a manner which is not shown in more detail, to a compressor of the Roots blower type. The outlet 3 is connected, in a manner which is not shown in more detail, to further devices.

A so-called multipipe damper 4 is arranged between the inlet 2 and the outlet 3.

In the exemplary embodiment which is shown here, both the inlet and the outlet comprise a diffuser. The inlet is provided with an inlet flange 5 to which a pipe member 6 is connected. A receiving ring 10 is welded to the opposite side of the vessel. The free open end of the pipe member 6 projects into this ring. As a result, variations in length both during assembly and during operation can be accommodated because the connection between the pipe member and receiving ring 10 is a sliding joint. In the vicinity of the end, the pipe member 6 is provided with comparatively large openings 12, for example by being cut, circumferential bodies 7 and longitudinal bodies 8 being delimited between the openings. These bodies consist of the same material as the pipe member. A perforated plate is arranged in the pipe member at the location of these openings 12. This plate is denoted by 9. At the location of the perforation, the surface of the openings 12 comprises preferably 50–70% of the circumferential surface area of the pipe. The perforated plate 9 can be attached to the pipe member 6 by means of welding. It can be seen from FIG. 1 that the perforated plate 9, like the opening 12, extends only on the "left-hand side" of the pipe body 6. This means that gas which flows in is initially directed to the left, so that the distance which it has to cover in order to reach the outlet 3 is as great as possible.

With the design described here, it is possible to make use of a comparatively inexpensive perforated plate, sufficient strength nevertheless being provided by the presence of circumferential bodies 7 in combination with longitudinal bodies 8. If, following a prolonged service life, the perforated plate were to be damaged and need to be replaced, it is possible, in a simple manner, to remove the welded joint connecting it to the pipe member 6 and to use a new perforated plate.

Figure 5:
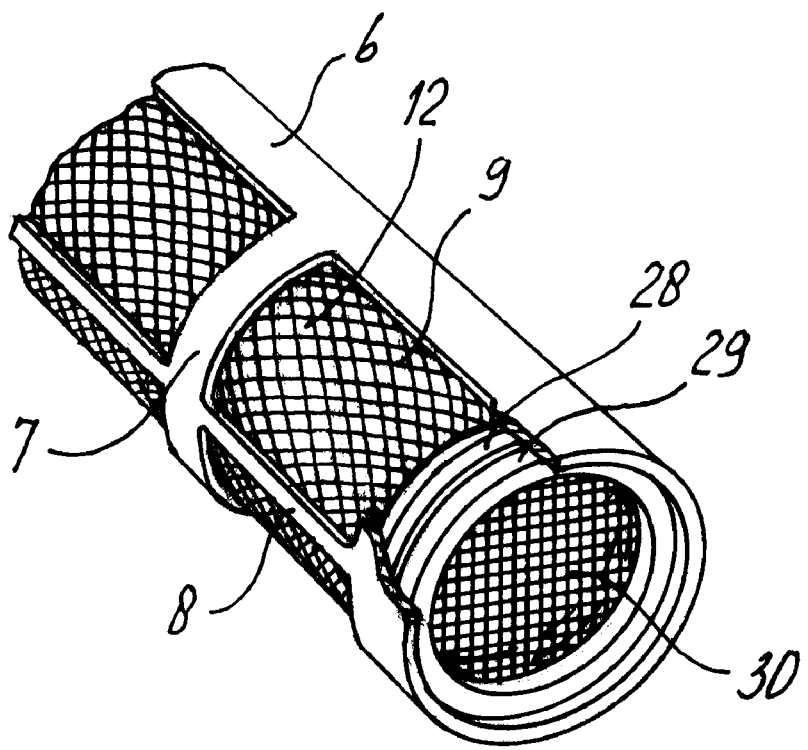
FIG. 5 shows a detail of the inlet of the vessel.

Two rings 28, 29, between which a perforated plate 30 is arranged, are located in the end part of pipe member 6. In this way, an extra damping chamber 31 is delimited. This is shown in detail, cut away, in FIG. 5. This design provides a further damping effect.

The outlet diffuser arranged in outlet 3 is designed in a corresponding manner to the inlet diffuser. It comprises an outlet flange 15, pipe member 16 provided with circumferential bodies 17 and longitudinal bodies 18. Here, owing to the direction of flow of the gas, 15 the perforated plate 19 is attached to the outside of the pipe member. The pipe member 16 is again attached with the aid of a receiving ring 20. The outlet diffuser shown here is not provided with the components 28–30, but it should be understood that these components may be arranged therein.

Moreover, the vessel contains silencing members comprising two curved tube plates 24, 25 which are connected, via supports 22, to the circumference of the vessel. Apart from a water drain 23, both the plates are completely sealed. Open pipes 26 extend through these tube plates. It can be seen from the drawings that the plates 24 and 25 are of convex design. A filling 27 may be situated between these tube plates. This filling then preferably consists of a sound-absorbing material and is obtained, for example, by filling with bituminous material.

Although the tube plates 24 and 25 are shown at a certain distance apart in the present exemplary embodiment, it should be understood that they may also be attached to one another.

Tests on the damper described above have shown that the variation in the average absolute pressure can easily be reduced from the level of 2% which has hitherto been customary to 1%. At certain frequencies, a reduction to 0.5% has even been observed. Naturally, this is dependent on the design of the remaining components of the pulsation damper. With the design described here, it has been found that the pressure loss through the damper lies entirely within the demands set. Naturally, these demands are dependent on the absolute pressure which is present in the damper.

Although the invention is described above on the basis of a preferred embodiment, it will be understood by persons skilled in the art that numerous modifications may be made to this embodiment without departing from the scope of the present application for which rights are sought in the appended claims.

What is claimed is:

1. A pulsation damper for damping low-frequency gas pulses, comprising a vessel having an inlet, an outlet and a silencing member which are arranged in the vessel, at least the inlet being provided with a diffuser comprising a tubular member which is provided with a plurality of first openings, the tubular member comprising a plurality of second openings and having reinforcement bodies which extend around a circumference of the tubular member, at least one of the second openings being covered by a plate, the plate being provided with the first openings which are smaller than the second openings.

2. A pulsation damper according to claim 1, wherein the tubular member is provided, in a region of the first openings with longitudinal reinforcement bodies which extend in an axial direction thereof.

3. A pulsation damper according to claim 2, wherein the plate is arranged upstream, in a direction of flow of the gas, of the reinforcement bodies.

4. A pulsation damper according to claim 1, wherein the inlet diffuser has a portion facing towards the outlet and a portion facing away from the outlet and only the portion facing away from the outlet is provided with the first openings.

5. A pulsation damper according to claim 1, wherein the inlet and the outlet are each provided with a diffuser.

6. A pulsation damper according to claim 2, wherein the inlet and the outlet are each provided with a diffuser.

7. A pulsation damper according to claim 3, wherein the inlet and the outlet are each provided with a diffuser.

8. A pulsation damper according to claim 4, wherein the inlet and the outlet are each provided with a diffuser.

9. A pulsation damper for damping low-frequency gas pulses, comprising a vessel having an inlet, an outlet and a silencing member which are arranged in the vessel, at least the outlet being provided with a diffuser comprising a tubular member which is provided with a plurality of first openings, the tubular member comprising a plurality of second openings and having reinforcement bodies which extend around a circumference of the tubular member, at least one of the second openings being covered by a plate, the plate being provided with the first openings which are smaller than the second openings.

10. A pulsation damper according to claim 9, wherein the tubular member is provided, in a region of the first openings with longitudinal reinforcement bodies which extend in an axial direction thereof.

11. A pulsation damper according to claim 10, wherein the plate is arranged upstream, in the direction of flow of the gas, of the reinforcement bodies.

12. A pulsation damper according to claim 10, wherein the inlet diffuser has a portion facing towards the outlet and a portion facing away from the outlet and only the portion facing away from the outlet is provided with the first openings.

13. A pulsation damper according to claim 9, wherein a chamber is delimited between the closed end of the pipe and said first openings, and in which a perforated plate is arranged between the chamber and the rest of the pipe.

14. A pulsation damper according to claim 9, further comprising:

a structure formed by the damping members, the structure closing off the vessel substantially completely over a cross-section;

a plurality of pipes, connecting on either side of the cross-section and extending through the structure; and two plates forming a portion of the closing structure and disposed at a distance from one another in a longitudinal extent of the tubular member.

15. A pulsation damper according to claim 14, wherein at least one of the plates is curved and curves away from the other plate.

16. A pulsation damper according to claim 14, wherein a chamber formed between the plates is filled with sound-absorbing material.

17. A pulsation damper according to claim 9, further comprising:

a structure formed by the damping members, the structure closing off the vessel substantially completely over a cross-section;

a plurality of pipes, connecting on either side of the cross-section and extending through the structure; and two plates forming a portion of the closing structure and disposed at a distance from one another in a longitudinal extent of the tubular member.

18. A pulsation damper according to claim 17, wherein at least one of the plates is curved and curves away from the other plate.

19. A pulsation damper according to claim 17, wherein a chamber formed between the plates is filled with sound-absorbing material.

* * * * *